US008070483B2

(12) United States Patent
Zalman

(10) Patent No.: US 8,070,483 B2
(45) Date of Patent: Dec. 6, 2011

(54) BURNER WITH ATOMIZER

(75) Inventor: Lucien Zalman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 289 days.

(21) Appl. No.: 12/323,896

(22) Filed: Nov. 26, 2008

(65) Prior Publication Data

US 2009/0136882 A1 May 28, 2009

Related U.S. Application Data

(60) Provisional application No. 60/991,165, filed on Nov. 29, 2007.

(30) Foreign Application Priority Data

Nov. 28, 2007 (EP) .................................. 07121741

(51) Int. Cl.
F23D 11/36 (2006.01)
(52) U.S. Cl. ........................ 431/160; 239/132.3; 60/730
(58) Field of Classification Search .................. 431/160; 239/132.3; 60/730
See application file for complete search history.

(56) References Cited

U.S. PATENT DOCUMENTS

| 2,414,459 | A | | 1/1947 | Fletcher | 158/1.5 |
|---|---|---|---|---|---|
| 3,074,648 | A | * | 1/1963 | Stone | 239/107 |
| 3,266,552 | A | | 8/1966 | Denis | 158/76 |
| 3,334,885 | A | * | 8/1967 | Taylor | 239/132.3 |
| 3,346,190 | A | * | 10/1967 | Shepherd | 266/226 |
| 3,578,793 | A | * | 5/1971 | Jones et al. | 239/132.3 |
| 3,644,076 | A | * | 2/1972 | Bagge | 431/284 |
| 4,384,846 | A | * | 5/1983 | Waldhofer | 431/284 |
| 5,129,583 | A | * | 7/1992 | Bailey et al. | 239/427 |
| 5,484,107 | A | * | 1/1996 | Holmes | 239/427.5 |
| 6,234,406 | B1 | * | 5/2001 | Thomas | 239/132 |
| 6,652,267 | B1 | * | 11/2003 | Brehm et al. | 431/160 |
| 2007/0044766 | A1 | | 3/2007 | Brown | 123/468 |
| 2010/0101229 | A1 | * | 4/2010 | York et al. | 60/737 |

FOREIGN PATENT DOCUMENTS

| EP | 128805 | 12/1984 |
|---|---|---|
| EP | 268432 | 5/1988 |
| GB | 1135411 | 12/1968 |
| WO | WO8302147 | 6/1983 |
| WO | WO0155640 | 8/2001 |

* cited by examiner

Primary Examiner — Kenneth Rinehart
Assistant Examiner — Jorge Pereiro

(57) ABSTRACT

A burner comprising channels for the separate supply of a liquid fuel and an oxygen-containing gas. The burner comprises a twin-fluid atomizer head comprising first flow-through passages fluidly connected to the supply channel for oxygen-containing gas and second flow-through passages fluidly connected to the fuel supply channel. The second flow-through passages exit into the first flow-through passages at a point before the first flow-through passages exit into a coaxial ring of orifices. A cooling jacket envelopes the supply channel walls. The orifices run through the atomizer head at a distance from the cooling jacket. The atomizer head can, for example, be made of a first metal, such as a copper alloy, and the cooling jacket can be made of a second metal with a lower thermal conductivity than the first metal, for example steel.

6 Claims, 4 Drawing Sheets (G-G)

(D-D)

(B-B)

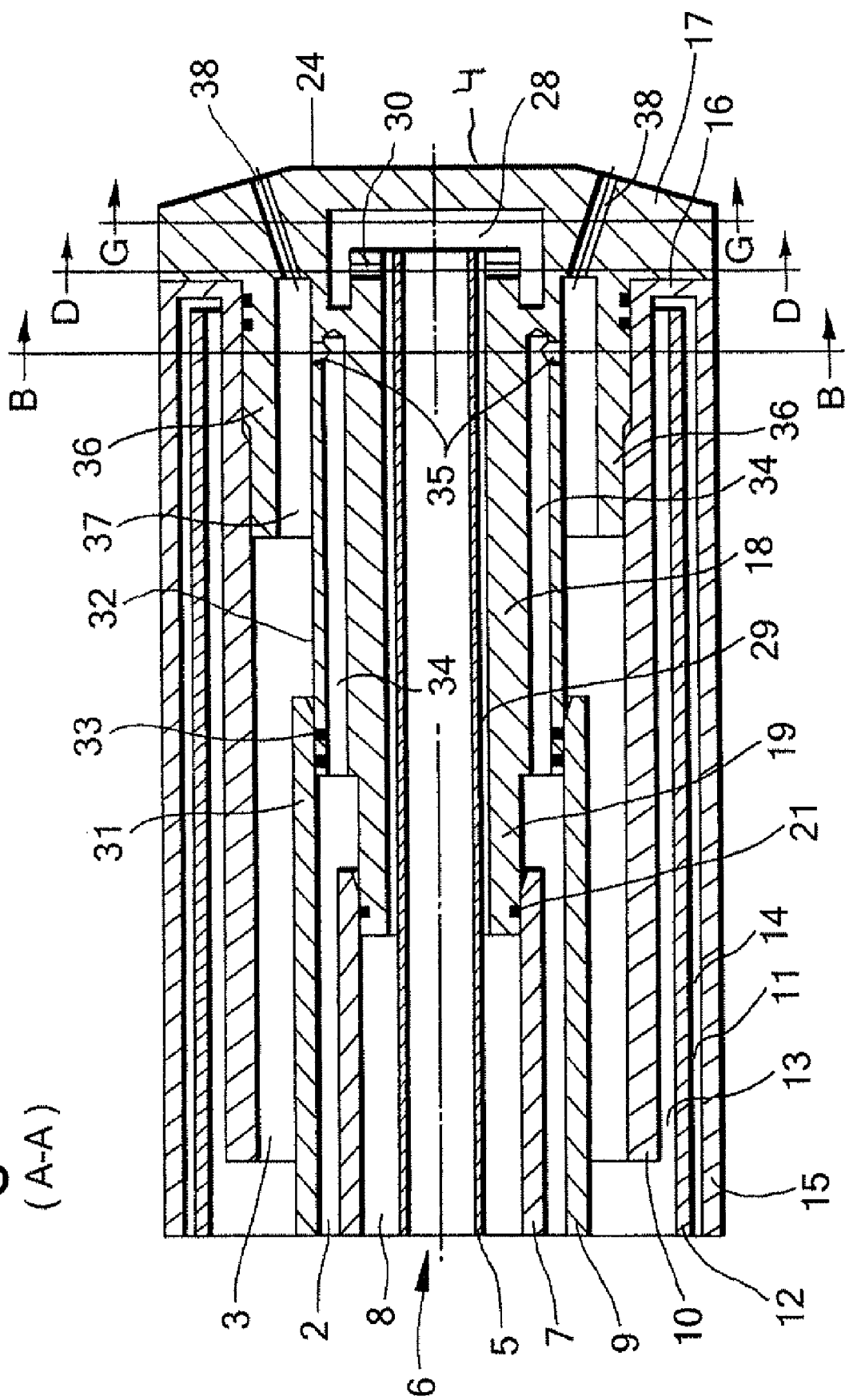

BURNER WITH ATOMIZER

This patent application claims the benefit of European patent application No. 07121741.8, filed Nov. 28, 2007 and U.S. Provisional Application 60/991,165, filed Nov. 29, 2007, both of which are incorporated herein by reference

FIELD OF THE INVENTION

The present invention relates to a burner comprising at least two coaxial channels for the separate supply of a liquid fuel and an oxygen-containing gas from a supply side to a discharge end, the burner comprising a twin-fluid atomizer head plugged into the discharge end.

BACKGROUND OF THE INVENTION

U.S. Pat. No. 2,414,459 discloses a fluid fuel burner atomizing the fuel in a thin-walled spray permeable by an airstream supplied to form a combustible mixture. The spray has a hollow frusto-conical form to afford a maximum amount of surface exposure to a surrounding envelope of combustion air. The burner is not cooled and could therefore not be used under high temperature loads.

WO-A-01/55640 describes a burner comprising at least two channels for separate supply of a liquid fuel and an oxygen containing gas. The burner has a twin fluid atomizer head fixed to the discharge end of the burner.

U.S. Pat. No. 3,266,552 describes a burner having a cooling jacket to protect the burner from the heat as created in the interior of a furnace.

To obtain gaseous fuels from solid carbonaceous materials, finely divided solid carbonaceous fuel carried by a gas carrier, for example pulverized coal carried by a gas carrier such as nitrogen gas and/or carbon dioxide, can be partially combusted in a gasification reactor using an oxygen-containing gas. Due to the incomplete combustion, the formed fuel gas is suitable for further combustion. The partial combustion processes can be used, for example for producing pressurized synthesis gas, fuel gas or reducing gas.

In the reactor a flame is maintained by reacting the fuel with the oxygen in the oxygen-containing gas at temperatures above 1300° C. In this reaction carbon monoxide and hydrogenare formed and at some temperatures it is also possible to form methane.

To start-up the gasification reactor, the temperature and the pressure are raised to a level sufficiently high to enable reaction of the fuel with the oxygen-containing gas. For combusting heavy, difficult ignitable fuels, such as pulverized coal, it is common practice to generate a relatively small start-up flame by using a fuel which is less likely to blow out. The small start-up flame is used for ignition of the main fuel flow. Means are needed for igniting the start-up flame and for maintaining a stable flame during temperature and pressure build-up and during ignition of the main fuel flow. If the combustion operation is to be carried out in a closed, confined and pressurized space, such as for example in coal gasification processes, the ignition is normally carried out in two steps. A first ignition flame is generated, which first ignition flame is used to ignite a gaseous or liquid fuel, thereby producing a second larger ignition flame, which in its turn is used to ignite the main fuel flow. The above process for igniting a fuel flow in a pressurized combustion chamber is normally carried out by means of an ignition device and a separate start-up burner operating on gaseous or liquid fuel. The start-up burner is not only used for igniting the main fuel flow but also for pressurizing and heating the combustion chamber before the main fuel is introduced.

It would be an advancement in the art to provide a burner for liquid fuels comprising atomizer units which can be used as a start-up burner for use in a reactor operated at very high temperatures and high pressure loads.

SUMMARY OF THE INVENTION

The above has been achieved with a burner comprising at least two supply channels for a separate supply of a liquid fuel and an oxygen-containing gas defined by at least two tubular walls extending in a coaxially spaced relation from a supply side to a discharge end, the burner comprising a twin-fluid atomizer head fixed to the discharge end comprising one or more first flow-through passages fluidly connected to the supply channel for oxygen containing gas and second flow-through passages fluidly connected to the supply channel for the liquid fuel, the second flow-through passages exiting into the one or more first flow-through passages under an angle at a point before the first flow-through passages exit into a coaxial ring of orifices, wherein a cooling jacket is coaxially disposed to envelope the tubular supply channel walls and wherein the orifices run through the atomizer head at a distance from the cooling jacket and wherein the atomizer head is made of a first metal and the cooling jacket is made of a second metal with a lower thermal conductivity than the first metal.

It has been found that maintaining a distance between the orifices and the cooling jacket effectively reduces the risk of heat damage to the burner parts. This is particularly the case during preparation for shutdown of the burner, when the flow velocity of the oxygen-containing gas is reduced causing the risk of retraction of the flames into the orifices, notwithstanding possible safety measures such as the gradual replacement of oxygen by an inert gas, such as nitrogen, before or during shutdown. Although one would be inclined to use the highest thermal conductivity for the cooling jacket, it has been found that with the two-metal construction of the burner according to the present invention, an optimized balance can be realized between high mechanical strength on the one hand and excellent heat dissipation on the other.

BRIEF DESCRIPTION OF THE DRAWINGS

FIG. 1C shows a cross section of the burner along line A-A in FIG. 1B;

DETAILED DESCRIPTION

Figure 1A:
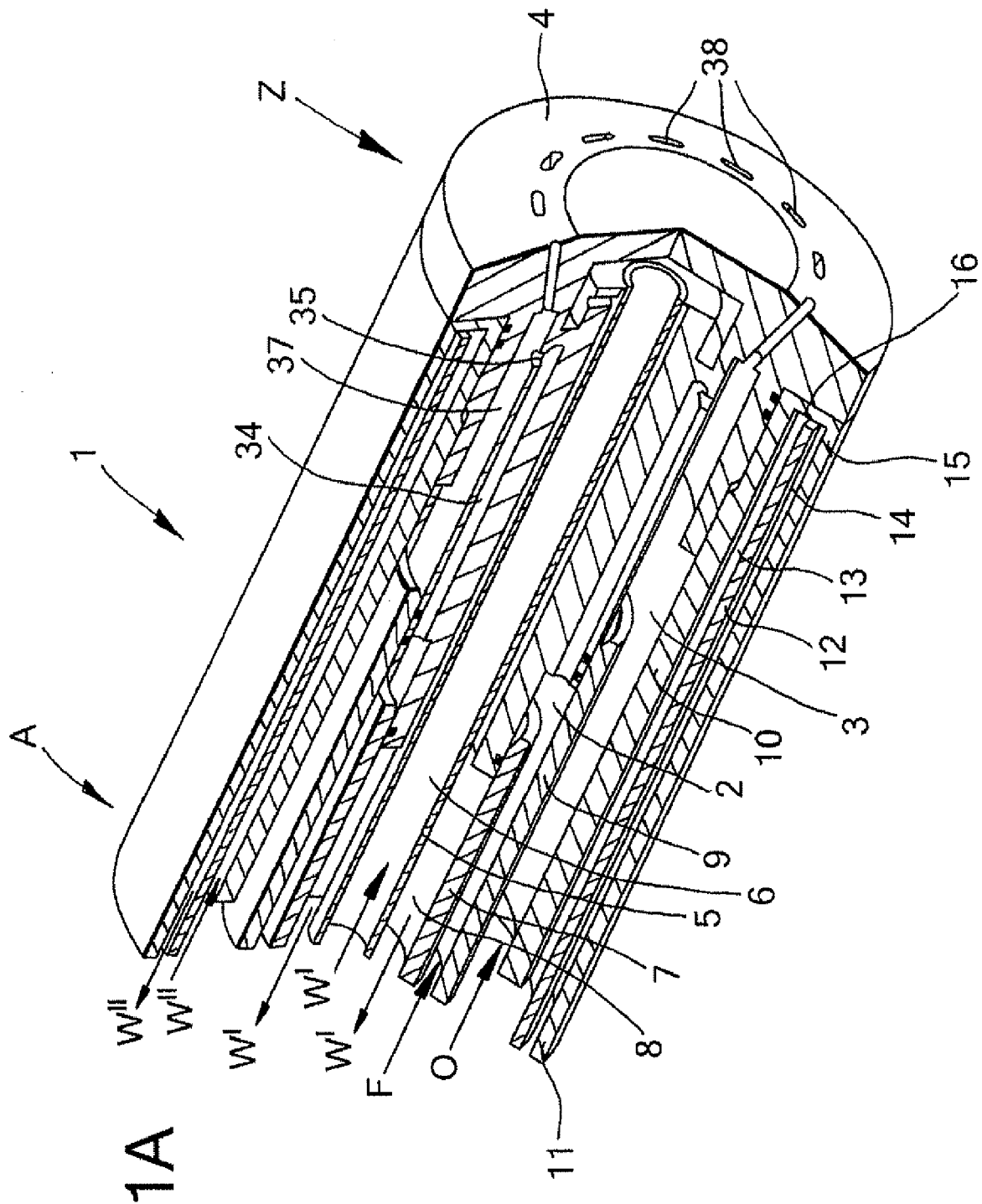
FIG. 1A shows in perspective a longitudinal cross section of a burner according to the invention.
Figure 1B:
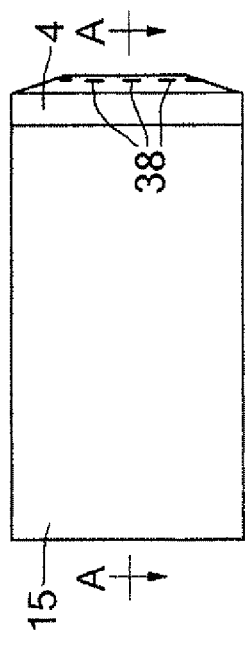
FIG. 1B shows a side view of the burner of FIG. 1A.
Figure 1F:
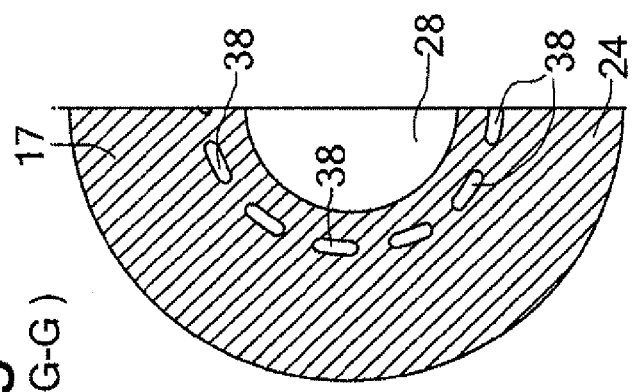
FIG. 1F shows a cross section of the burner along line G-G in FIG. 1C.
Figure 1E:
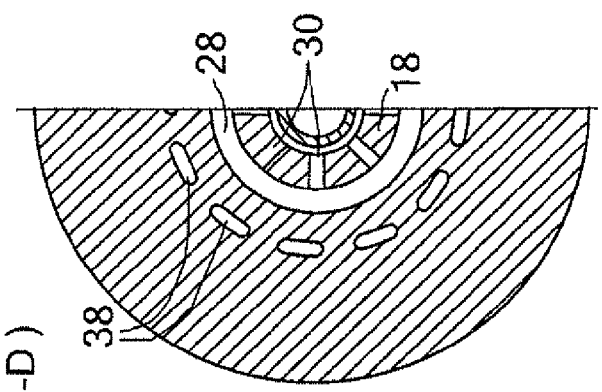
FIG. 1E shows a cross section of the burner along line D-D in FIG. 1C.
Figure 1D:
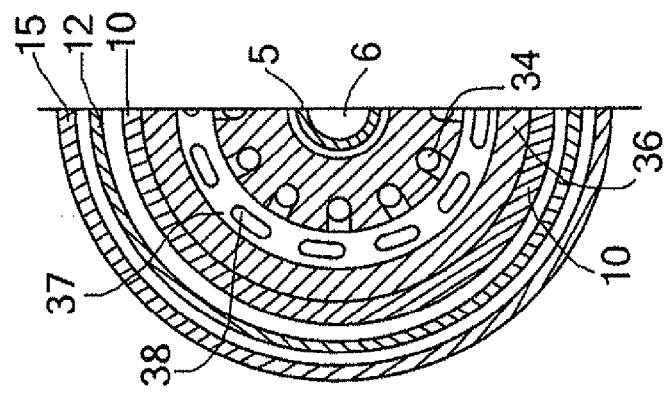
FIG. 1D shows a cross section of the burner along line B-B in FIG. 1C.

The cooling jacket can suitably be made of steel and the atomizer head is made of a metal with a higher coefficient of thermal conductivity, for example a metal with a thermal conductivity of at least 250 W/m*K, e.g. of at least 300 W/m*K, for instance copper or preferably a copper alloy.

To obtain a more effective cooling, particularly of the parts at a radial distance from the cooling jacket, the burner can comprise a central coolant supply channel and an annular coolant return channel coaxially arranged with the coolant supply channel, operatively connected by a coolant flow path under the outer surface of the atomizer head.

Optionally, the atomizer head can comprise a threaded skirt provided with a screw thread functionally cooperative with a corresponding screw thread on the cooling jacket. The skirt can be provided with an internal screw thread matching a corresponding external screw thread on the outer surface of the cooling jacket. Alternatively, the skirt can be provided with an external screw thread matching a corresponding internal screw thread on the surface of the cooling jacket enveloping the skirt.

To cope with differences in thermal expansion of the various burner parts, the atomizer head can be coupled to one or more of the tubular channel walls by means of a sleeve joint, allowing axial sliding of the parts relative to the atomizer head.

If the orifices are dimensioned to accelerate the flow of atomized fuel to at least sonic velocity, a distance can be maintained between the flame and the orifices over the entire pressure range from ambient to pressures of 20 bar. This flow acceleration can be achieved by gradually narrowing of the flow path.

The orifices can be circular apertures or they can be slit-shaped, oval, polygonal or have any other suitable shape. The orifices can have any suitable depth. Generally, deeper orifices lower the risk of damage by retracting flames, for example during preparation for shutdown of the burner.

The supply channel for the oxygen containing gas and the orifices can be dimensioned in such way as to adjust the flow velocity of the gas flow to optimize the break-up and atomization of the fuel.

The invention will now be described in more detail, by way of example only, with reference to the accompanying drawings.

FIGS. 1A-F show an end section of a burner 1 comprising channels 2, 3 for the supply of liquid fuel and oxygen-containing gas from an upstream supply side A to a downstream discharge end Z. An atomizer head 4 is plugged into the discharge end of the burner 1. Away from the atomizer head 4, the burner 1 is built of the following coaxially spaced parts disposed along the longitudinal axis:

An inner tube 5 defining an inner cooling water channel 6 for the supply of cooling water for an inner cooling system;

A second tube 7 coaxially surrounding the inner tube 5 defining an annular cooling water return channel 8 for the discharge of cooling water;

A third tube 9 coaxially surrounding the second tube 7 and defining an annular supply channel 2 for the supply of a liquid fuel, such as diesel or oil;

A fourth tube 10 coaxially surrounding the third tube 9, defining an annular supply channel 3 for the supply of an oxygen-containing gas and forming the inner wall of a cooling jacket 11;

A cylindrical separator wall 12 separating the cooling jacket 11 into a cooling water supply flow path 13 running in the direction of the discharge end Z and a cooling water return path 14 running in the opposite direction;

An outer wall 15 forming the outer wall of the cooling jacket 11.

In the FIG. 1A, arrow W' indicates the flow path of the cooling water in the inner cooling system, whereas arrows W''' indicate the flow path of the cooling water in the cooling jacket 11. Arrows O show the flow path of the oxygen containing gas whereas arrows F show the flow path of the liquid fuel.

Spacers (not shown) can be used to fixate the parts in the coaxial arrangement.

At the discharge end Z, the cooling jacket 11 is closed off by a circumferential end wall 16 disposed normal to the longitudinal axis. At a distance from the end wall 16, the separator 12 ends allowing the cooling water to pass from the supply side 13 of the cooling jacket 11 to the discharge side 14. At this point, the cooling water passes the parts with the highest thermal loads.

The atomizer head 4 comprises a downstream front section 17 and a cylindrical section 18 coaxially disposed along the longitudinal axis of the burner 1. At its upstream side the cylindrical section 18 has a coaxial upstream protrusion 19 tightly fitting into the second tube 7 having an enlarged inner diameter to form a sleeve joint sealed off with a sealing ring 21, allowing axial movement to cope with differences in thermal expansion. The front section 17 comprises a circular front wall 24. The cylindrical section 18 is provided with an inner bore 29. The inner tube 5 of the inner cooling system runs through the inner bore 29 to exit into an inner space 28 in the front section 17. The space between the outer surface of inner tube 5 and the inner surface of the bore 29 defines a coolant return flow path. Radially extending return channels 30 connect the open inner space 28 of the front section 17 with the inner bore 29 in the cylindrical section 18. The return channels 30 are equidistantly spaced from each other.

In the inner cooling water system, cooling water flows from the inner tube 5 via cooling water channel 6 into the open inner space 28 of the front section 17, where it flows in radial direction via the return channels 30 into the coolant water return path defined by the inner surface of the central bore 29 and the outer surface of inner tube 5.

The third cylinder 9, defining the fuel supply channel 2 comprises a downstream end part 31 forming a tight fitting with the upstream end part 32 of the cylindrical section 18 of the atomizer head 4. The fitting is sealed with two sealing rings 33 to form a sleeve joint allowing axial movement to cope with differences in thermal expansion of the joint parts. The cylindrical section 18 is provided with a ring of equidistantly disposed longitudinal bores 34 each running parallel to the longitudinal burner axis from the fuel supply channel 2 to an atomizer port 35.

The atomizer head 4 comprises a cylindrical skirt 36 coaxially surrounding the cylindrical section 18 of the atomizer head 4 leaving an annular channel 37 fluidly connected to the supply channel 3 of oxygen containing gas. The annular channel 37 is in open connection with the longitudinal bores 34 via the atomizer ports 35. The circular front wall 24 of the atomizer head 4 is provided with orifices 38 in open connection with the annular channel 37.

The cylindrical skirt 36 is provided with an external screw thread (not shown in figure) cooperating with an internal screw thread on the inner surface of the cooling jackets inner wall 10.

Fuel liquid is supplied under pressure to enter the longitudinal bores 34 in the cylindrical section 18 of the atomizer head 4 through the atomizer ports 35 to the annular channel 37 where oxygen containing gas flowing with high velocity atomizes the fuel. The atomized fuel is discharged with sonic velocity via the orifices 38 to form a conical spray of finely divided fuel droplets enveloped by oxygen containing gas. Due to the sonic flow velocity of the atomized fuel, the flame starts at a distance from the atomizer head even under high pressure conditions in the reactor from ambient pressure to pressures of 20 bar. The distance between the flame and the atomizer head 4 reduces the heating on the burner parts and reduces the risk of flame flash backs into orifices 38.

The cooling jacket walls 10, 15, 16 are made of stainless steel. Besides cooling, it also protects the channel parts and the atomizer head 4 from mechanical loads, in particular pressure loads. The atomizer head 4 is made of a copper alloy.

Figure 2:
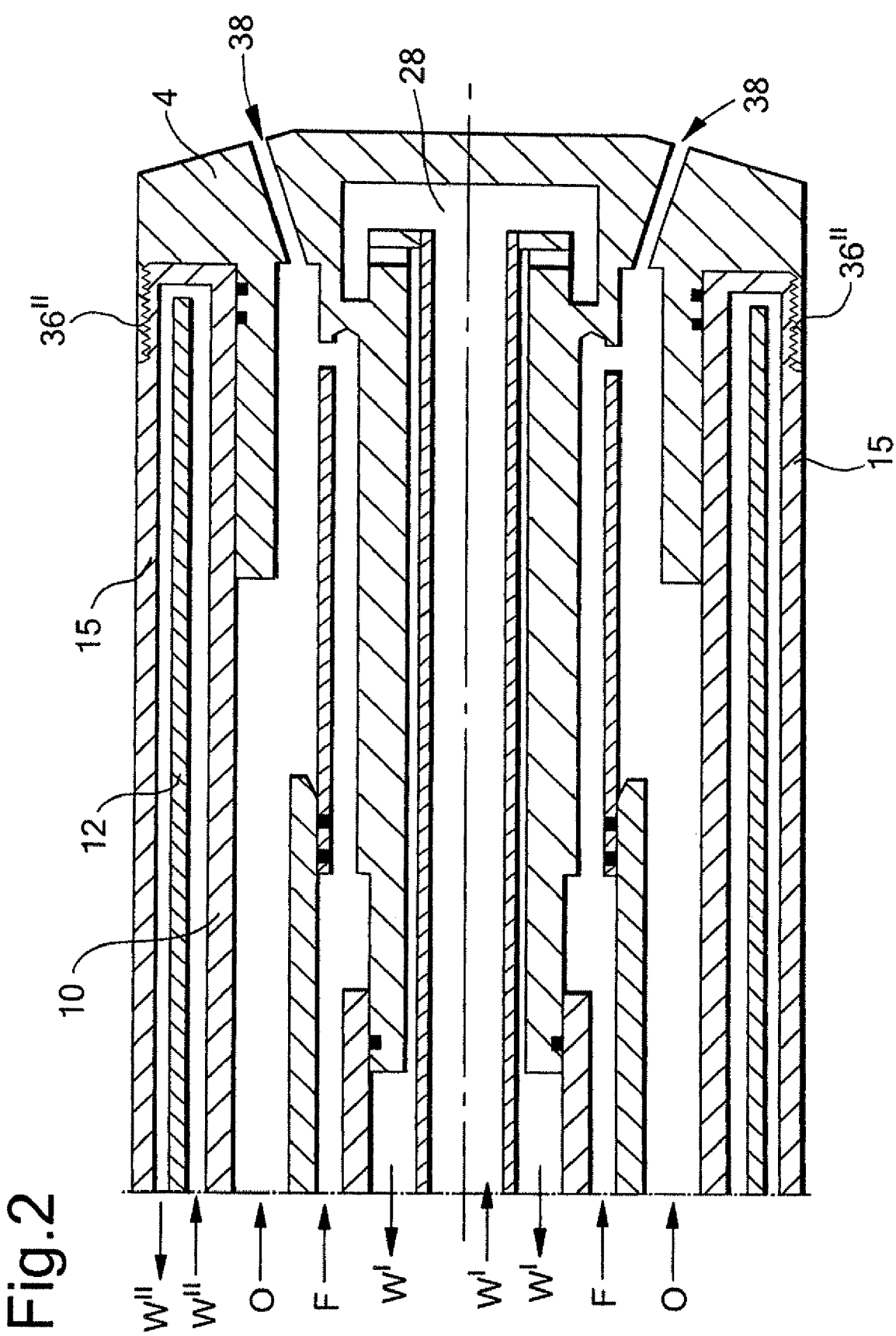
FIG. 2 shows a longitudinal cross section of an alternative embodiment of a burner according to the invention.

FIG. 2 shows in cross section a burner of a construction rather similar to the burner of FIGS. 1A-D. Similar constructional details are indicated with the same referential numbers as in FIG. 1. The burner of FIG. 2 does not comprise a screw threaded inner skirt for obtaining a screw connection between the atomizer head 4 and the inner wall 10 of the cooling jacket 11. Instead, the atomizer head comprises a skirt 36" with an internal screw thread cooperating with an external screw thread provided on the outer surface of the cooling jackets outer wall 15.

The invention claimed is:

1. A burner comprising at least two supply channels for a separate supply of a liquid fuel and an oxygen-containing gas defined by at least two tubular walls extending in a coaxially spaced relation from a supply side to a discharge end, the burner comprising a twin-fluid atomizer head fixed to the discharge end comprising one or more first flow-through passages fluidly connected to the supply channel for oxygen containing gas and second flow-through passages fluidly connected to the supply channel for the liquid fuel, the second flow-through passages exiting into the one or more first flow-through passages under an angle at a point before the first flow-through passages exit into a coaxial ring of orifices, wherein a cooling jacket is coaxially disposed to envelope the tubular supply channel walls and wherein the orifices run through the atomizer head at a distance from the cooling jacket and wherein the atomizer head is made of a first metal and the cooling jacket is made of a second metal with a lower thermal conductivity than the first metal wherein the atomizer head comprises a threaded skirt provided with a screw thread functionally cooperative with a corresponding screw thread on the cooling jacket.

2. Burner according to claim 1 wherein the atomizer head is coupled to at least one of the tubular channel walls by a sleeve joint.

3. The burner according to claim 1, wherein the orifices are dimensioned to accelerate the flow of atomized fuel to at least sonic velocity.

4. The burner according to claim 1, wherein the cooling jacket is made of steel and the atomizer head is made of a copper alloy.

5. The burner according to claim 1, wherein the atomizer head comprises an inner space operatively connecting a central coolant channel disposed along the longitudinal axis of the burner to an annular coolant channel coaxially arranged with the central coolant channel.

6. A burner comprising at least two supply channels for a separate supply of a liquid fuel and an oxygen-containing gas defined by at least two tubular walls extending in a coaxially spaced relation from a supply side to a discharge end, the burner comprising a twin-fluid atomizer head fixed to the discharge end comprising one or more first flow-through passages fluidly connected to the supply channel for oxygen containing gas and second flow-through passages fluidly connected to the supply channel for the liquid fuel, the second flow-through passages exiting into the one or more first flow-through passages under an angle at a point before the first flow-through passages exit into a coaxial ring of orifices, wherein a cooling jacket is coaxially disposed to envelope the tubular supply channel walls and wherein the orifices run through the atomizer head at a distance from the cooling jacket and wherein the cooling jacket is made of steel and the atomizer head is made of a copper alloy, wherein the atomizer head comprises a threaded skirt provided with a screw thread functionally cooperative with a corresponding screw thread on the cooling jacket.

* * * * *